United States Patent
Tomozawa et al.

(10) Patent No.: US 10,239,520 B2
(45) Date of Patent: Mar. 26, 2019

(54) PARKING ASSISTANCE DEVICE AND PARKING ASSISTANCE METHOD

(71) Applicants: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

(72) Inventors: Motokatsu Tomozawa, Nagoya (JP); Masaya Kato, Toyokawa (JP); Hiroyuki Tachibana, Okazaki (JP); Norio Imai, Anjyo (JP); Tomohisa Yamashita, Toyohashi (JP); Tsuyoshi Hoshino, Kariya (JP); Shogi Fukukawa, Nagoya (JP); Takatomo Asai, Nagoya (JP); Motonari Obayashi, Nagakute (JP); Hironobu Ishijima, Toyota (JP); Kiyoshi Takahashi, Hekinan (JP)

(73) Assignees: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

( * ) Notice: Subject to any disclaimer, the term of this patent is extended or adjusted under 35 U.S.C. 154(b) by 72 days.

(21) Appl. No.: 15/509,956

(22) PCT Filed: Sep. 10, 2015

(86) PCT No.: PCT/JP2015/075772
§ 371 (c)(1),
(2) Date: Mar. 9, 2017

(87) PCT Pub. No.: WO2016/039430
PCT Pub. Date: Mar. 17, 2016

(65) Prior Publication Data
US 2017/0259812 A1 Sep. 14, 2017

(30) Foreign Application Priority Data
Sep. 12, 2014 (JP) .................. 2014-186777

(51) Int. Cl.
*B60W 30/06* (2006.01)
*B62D 15/02* (2006.01)

(52) U.S. Cl.
CPC ........... *B60W 30/06* (2013.01); *B62D 15/027* (2013.01); *B62D 15/028* (2013.01);
(Continued)

(58) Field of Classification Search
CPC ........... B60W 30/06; B60W 2710/207; B60W 2540/18; B62D 15/028; B62D 15/027; B62D 15/0285
See application file for complete search history.

(56) References Cited

U.S. PATENT DOCUMENTS 4,931,930 A * 6/1990 Shyu et al. ........ B62D 15/0285
701/36
7,469,765 B2 * 12/2008 Spannheimer et al. .....................
B62D 15/0285
701/28
(Continued)

FOREIGN PATENT DOCUMENTS

| JP | 2003-341543 A | 12/2003 |
| JP | 2004-352120 A | 12/2004 |

(Continued)

OTHER PUBLICATIONS

Espacenet Translation of JP2010228591A, Oct. 2010, Chiba, 18 pages (Year: 2010).*

(Continued)

*Primary Examiner* — Dale W Hilgendorf
(74) *Attorney, Agent, or Firm* — Sughrue Mion, PLLC

(57) ABSTRACT

A parking assistance device according to an embodiment includes a determination unit that determines, when the parallel parking of a vehicle in a parking area is assisted, whether the parking space length of a frontage that the vehicle enters in the parking area is the sum of the full length of the vehicle and a certain length or more and a control unit that performs parking assistance for the vehicle along a route in which stationary steering control is not performed at a turning position of the vehicle when the parking space length is the sum of the full length of the vehicle and the certain length or more.

6 Claims, 12 Drawing Sheets

(52) U.S. Cl.
CPC ..... *B62D 15/0285* (2013.01); *B60W 2540/18* (2013.01); *B60W 2710/207* (2013.01)

(56) References Cited

U.S. PATENT DOCUMENTS

| | | | |
|---|---|---|---|
| 7,737,866 B2 * | 6/2010 | Wu et al. | B62D 15/0285 701/49 |
| 8,099,214 B2 * | 1/2012 | Moshchuk et al. | B62D 15/0285 701/41 |
| 8,115,653 B2 * | 2/2012 | Scherl et al. | B62D 15/028 701/41 |
| 8,903,608 B2 * | 12/2014 | Niemz et al. | B62D 15/028 701/41 |
| 2010/0039292 A1 | 2/2010 | Scherl et al. | |
| 2010/0274446 A1 * | 10/2010 | Sasajima et al. | G08G 1/14 701/36 |
| 2015/0307089 A1 * | 10/2015 | Vorobieva et al. | B62D 15/028 701/25 |
| 2016/0129939 A1 * | 5/2016 | Singh et al. | B62D 15/0285 701/41 |
| 2016/0375933 A1 | 12/2016 | Hiei et al. | |

FOREIGN PATENT DOCUMENTS

| | | | | |
|---|---|---|---|---|
| JP | 2006-347460 A | 12/2006 | | |
| JP | 2008-546577 A | 12/2008 | | |
| JP | 2010-228591 A | 10/2010 | | |
| JP | 2010228591 A | * 10/2010 | | B62D 6/00 |
| JP | 4946816 B2 | * 6/2012 | | B60W 30/06 |
| JP | 2015-110380 A | 6/2015 | | |

OTHER PUBLICATIONS

JPO Office Action for Application No. 2014-186777 dated May 24, 2016.
International Search Report for PCT/JP2015/075772 dated Dec. 22, 2015 [PCT/ISA/210].

* cited by examiner

PARKING ASSISTANCE DEVICE AND PARKING ASSISTANCE METHOD

CROSS REFERENCE TO RELATED APPLICATIONS

This application is national stage application of International Application No. PCT/JP2015/075772, filed Sep. 10, 2015, which designates the United States, incorporated herein by reference, and which claims the benefit of priority from Japanese Patent Application No. 2014-186777, filed Sep. 12, 2014, the entire contents of which are incorporated herein by reference.

TECHNICAL FIELD

Embodiment of the present invention relates to a parking assistance device and a parking assistance method.

BACKGROUND ART

Conventionally, in a technique that assists parking of a vehicle, a technique has been known that, when a vehicle stops at a turning position to perform turning while assisting the parking of the vehicle, performs stationary steering control that rotates a steering wheel while the vehicle is stationary.

CITATION LIST

Patent Literature

Patent Document 1: Japanese Patent Application Laid-open No. 2003-341543

SUMMARY OF INVENTION

Problem to be Solved by the Invention

However, stationary steering increases a. psychological burden on a driver and gives an excessive load to an electric power steering system.

Given this situation, it is being hoped that the psychological burden on the driver will be reduced and an overload on the electric power steering system will be reduced when parking assistance is performed.

Means for Solving Problem

A parking assistance device of the embodiment comprises a determination unit that determines, when parallel parking of a vehicle in a parking area is assisted, whether a parking space length of a frontage that the vehicle enters in the parking area is a sum of a full length of the vehicle and a certain length or more; and a control unit that performs parking assistance for the vehicle along a route in which stationary steering control is not performed at a turning position of the vehicle when the parking space length is the sum of the full length of the vehicle and the certain length or more. According to the configuration, an overload on the vehicle caused by an increase in the number of times of turning can be reduced.

In the parking assistance device of the embodiment, the control unit performs stationary steering control at the turning position of the vehicle when the parking space length is less than the sum of the full length of the vehicle and the certain length. According to the configuration, a psychological burden on a driver can be reduced, and an overload on a steering system can be reduced, whereby parking assistance control can be performed to the end.

In the parking assistance device of the embodiment, the control unit further determines whether stationary steering control is performed based on a deflection angle or a travelable distance of the vehicle at the turning position. According to the configuration, an overload on the vehicle can be reduced.

The parking assistance device of the embodiment further comprises a temperature sensor that detects a temperature of an electric power steering system, wherein the control unit further determines whether stationary steering control is performed based on the detected temperature of the electric power steering system. According to the configuration, the overload on the electric power steering system can be further reduced.

A parking assistance method of the embodiment comprises determining, when parallel parking of a vehicle in a parking area is assisted, whether a parking space length of a frontage that the vehicle enters in the parking area is a sum of a full length of the vehicle and a certain length or more; and performing parking assistance for the vehicle along a route in which stationary steering control is not performed at a turning position of the vehicle when the parking space length is the sum of the full length of the vehicle and the certain length or more. According to the configuration, the overload on the vehicle caused by the increase in the number of times of turning can be reduced.

A parking assistance device of the embodiment comprises a determination unit that determines, when parking of a vehicle in a parking area is assisted, whether a length of a frontage that the vehicle enters in the parking area is a sum of a full length of the vehicle and a certain length or more; and a control unit that performs parking assistance for the vehicle along a route drawn based on a clothoid curve at a turning position of the vehicle when the control unit determines that the length of the frontage is the sum of the full length of the vehicle and the certain length or more, stationary steering control not being performed in the route. According to the configuration, the overload on the vehicle caused by the increase in the number of times of turning can be reduced.

In the parking assistance device of the embodiment, the control unit determines a route so as to cause the vehicle to drive over a lowermost curb in the parking area when the length of the frontage is shorter than a certain reference length.

BRIEF DESCRIPTION OF DRAWINGS

FIG. 1 is an exemplary perspective view illustrating a state in which part of a cabin of a vesicle according to an embodiment is seen through;

DESCRIPTION OF EMBODIMENTS

Exemplary embodiments of the present invention will be disclosed below. Configurations according to the embodiments described below, and operations, results, and effects achieved by these configurations are merely exemplary. The present invention can be achieved by any configuration other than the configurations disclosed in the embodiments below. The present invention can obtain at least one of various kinds of effects and secondary effects based on the basic configurations.

A vehicle 1 according to the present embodiment may be an automobile having an internal combustion engine (not illustrated) as a drive source, that is, an internal combustion engine automobile, may be an automobile having an electric motor (not illustrated) as a drive source, that is, an electric vehicle or a fuel cell electric vehicle, may be a hybrid vehicle having both of the internal combustion engine and the electric motor as drive sources, or may be an automobile having other drive sources, for example. The vehicle 1 can mount a variety of gear shifters, and can mount a variety of devices required to drive an internal combustion engine and an electric motor, such as systems and components. The style, number, layout, and the like of equipment involved in driving wheels 3 of the vehicle 1 can be set in various ways.

Figure 1:
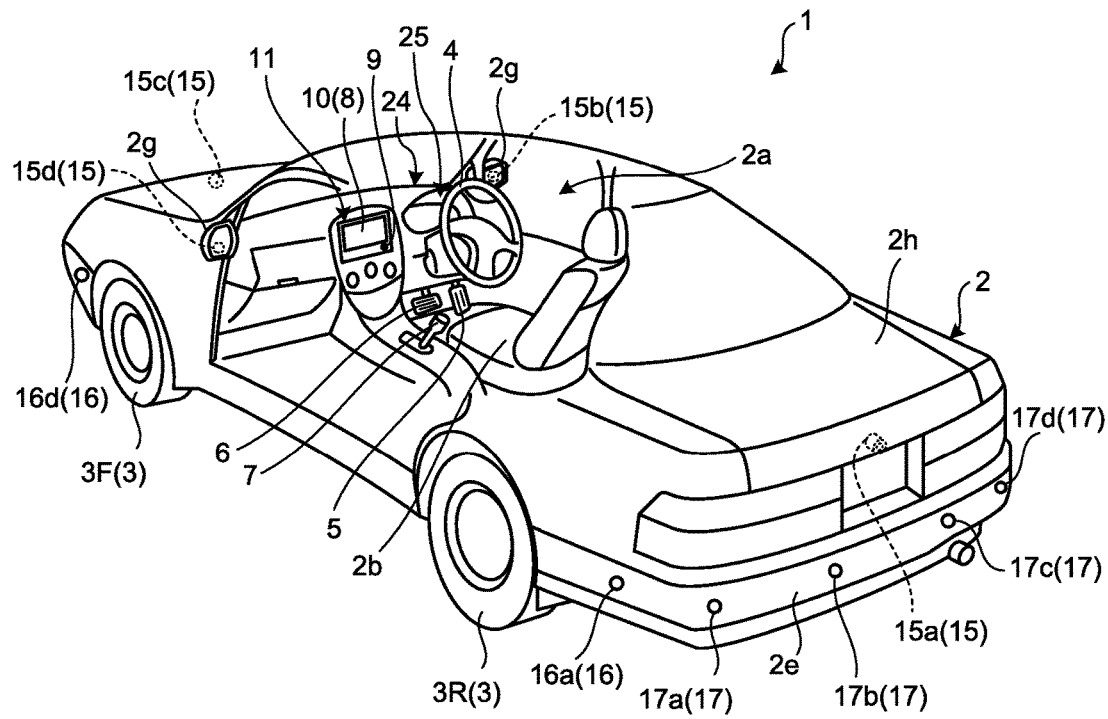
Figure 2:
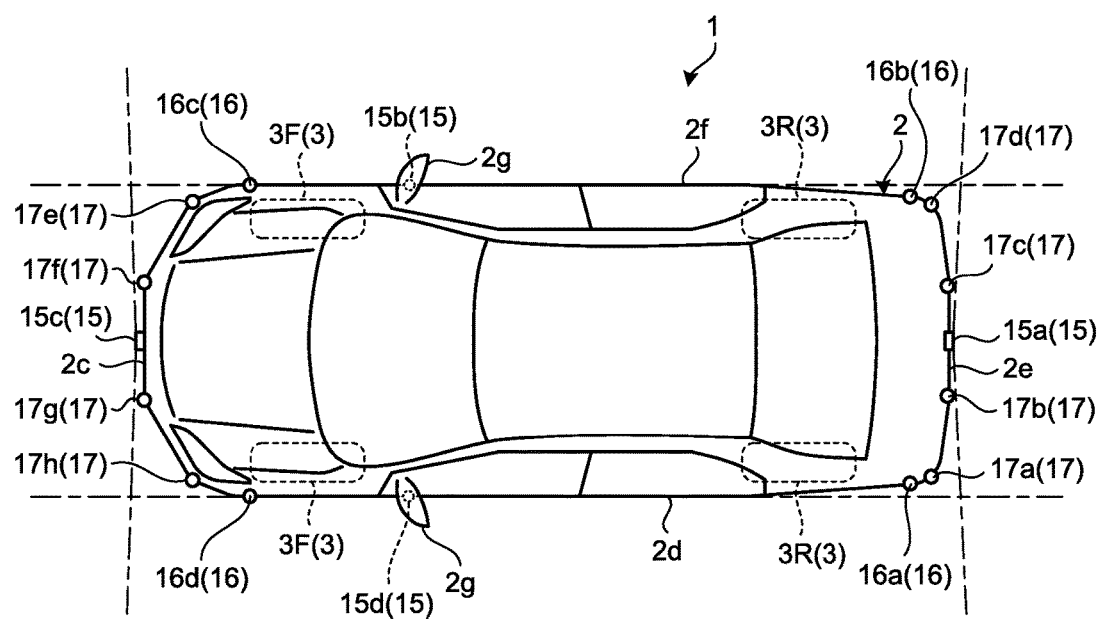
FIG. 2 is an exemplary plan view (bird's eye view) of the vehicle according to the embodiment.

FIG. 1 is a exemplary perspective view illustrating a state in which part of a cabin of the vehicle according to the embodiment is seen through. FIG. 2 is an exemplary plan view (bird's eye view) of the vehicle according to the embodiment. As illustrated in FIG. 1, a vehicle body 2 constitutes a cabin 2a in which an occupant (not illustrated) rides. In the cabin 2a, a steering unit 4, an accelerating operation unit 5, a braking operation unit 6, a gear shift operating unit 7, and the like are provided in a state of facing a seat 2b of a driver as an occupant. The steering unit 4 is a steering wheel protruding from a dash board 24, for example. The accelerating operation unit 5 is an accelerator pedal positioned at the driver's foot, for example. The braking operation unit 6 is a brake pedal positioned at the driver's foot, for example. The gear shift operating unit 7 is a shift lever protruding from a center console, for example. The steering unit 4, the accelerating operation unit 5, the braking operation unit 6, and the gear shift operating unit 7 are not limited to the above.

In the cabin 2a, a display device 8 as a display output unit and a sound output device 9 as a sound output unit are provided. The display device 8 is a liquid crystal display (LCD) or an organic electroluminescent display (OELD), for example. The sound output device 9 is a speaker, for example. The display device 8 is covered by a transparent operation input unit 10 such as a touch panel. An occupant can visually identify an image displayed on a display screen of the display device 8 via the operation input unit 10. The occupant can also perform operation input by touching, pressing, manipulating, or operating the operation input unit 10 with the fingers and the like at a position corresponding to the image displayed on the display screen of the display device 8. The display device 8, the sound output device 9, and the operation input unit 10 are provided to a monitor device 11 positioned in the center in a vehicle width direction, that is, in the right and left direction of the dash board 24, for example. The monitor device 11 can have an operation input unit (not illustrated) such as a switch, a dial, a joystick, and a push button. A sound output device (not illustrated) can be arranged at positions other than the monitor device 11 in the cabin 2a, and the sound output device 9 of the monitor device 11 and another sound output device can output sound. The monitor device 11 can be doubled as a navigation system or an audio system, for example. In the cabin 2a, a display device 12 different from the display device 8 is provided.

Figure 3:
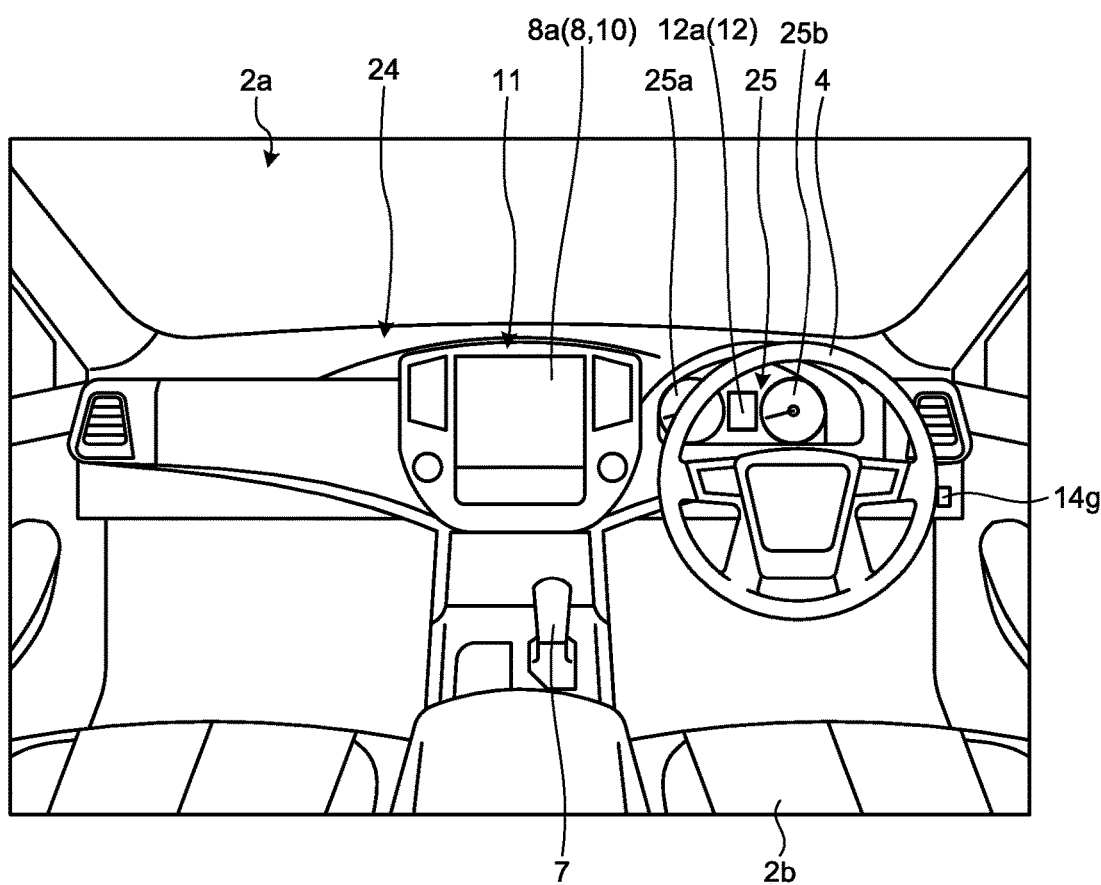
FIG. 3 is a diagram of an example of a dash board of the vehicle according to the embodiment when viewed from the rear side of the vehicle.

FIG. 3 is a diagram of an example of the dash board of the vehicle according to the embodiment when viewed from the rear side of the vehicle. As illustrated in FIG. 3, the display device 12 is arranged on an instrument panel unit 25 of the dash board 24, for example, and is positioned between a speed indicating unit 25a and a revolution indicating unit 25b in the substantially center of the instrument panel unit 25. The size of a screen 12a of the display device 12 is smaller than that of a screen 8a of the display device 8. The display device 12 can primarily display an image indicating information on parking assistance of the vehicle 1. The amount of information displayed on the display device 12 may be smaller than that displayed on the display device 8. The display device 12 is an LCD or an OELD, for example. The display device 8 may display information displayed on the display device 12.

As illustrated in FIGS. 1 and 2, the vehicle 1 is a four-wheel automobile, for example, and has two right and left front wheels 3F and two right and left rear wheels 3R. All of these four wheels 3 can be steered.

Figure 4:
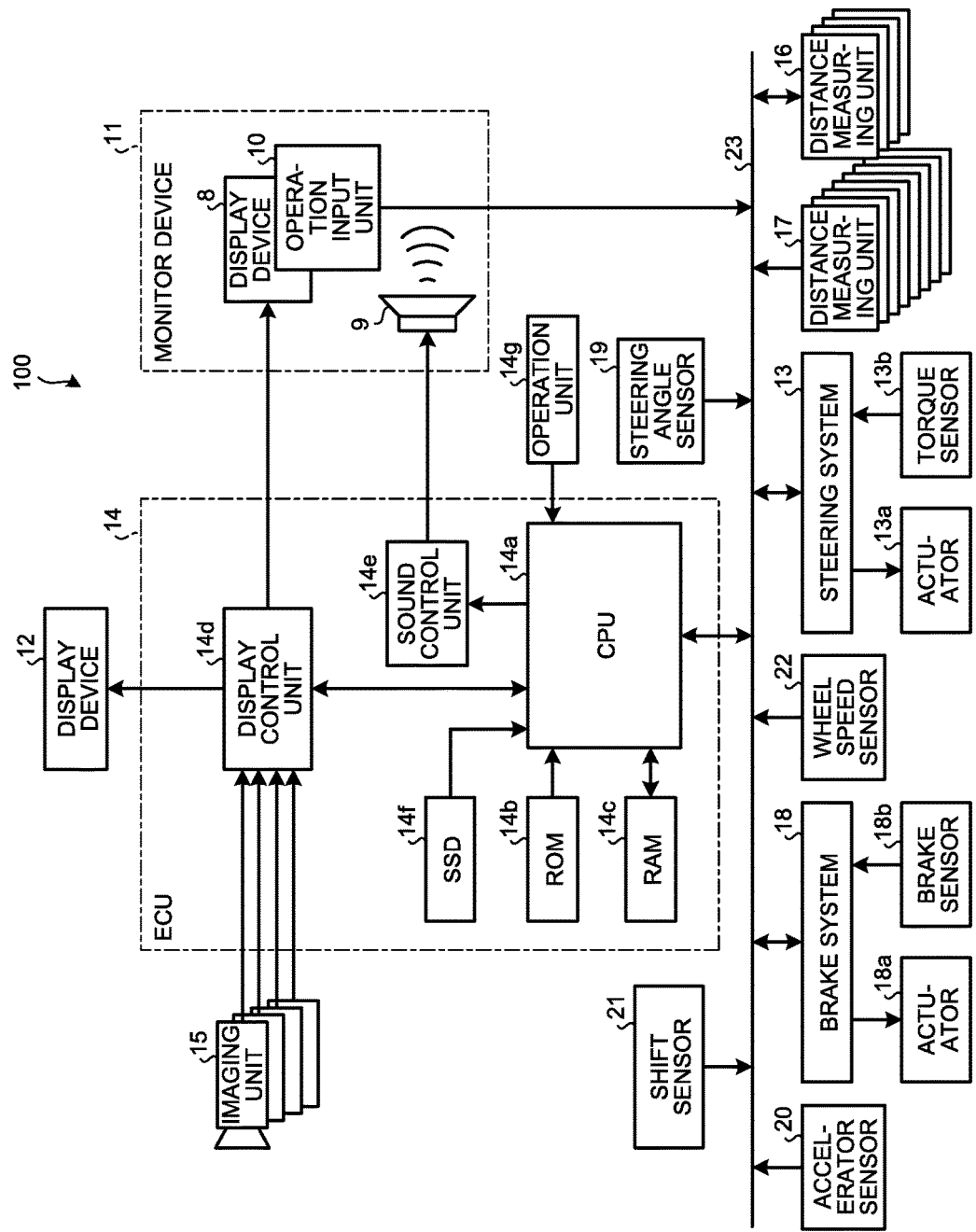
FIG. 4 is an exemplary block diagram illustrating a configuration of a parking assistance system according to the embodiment.

FIG. 4 is an exemplary block diagram illustrating a configuration of a parking assistance system according to the embodiment. As illustrated in FIG. 4, the vehicle 1 has a steering system 13 configured to steer at least two wheels 3. The steering system 13 includes an actuator 13a and a torque sensor 13b. The steering system 13 is electrically controlled by an electronic control unit (ECU) 14 and the like to operate the actuator 13a. The steering system 13 is an electric power steering system or a steer-by-wire (SBW) system, for example. The steering system 13 causes the actuator 13a to add torque or assist torque to the steering unit 4 to assist steering effort or causes the actuator 13a to steer the wheel(s) 3. In this case, the actuator 13a may steer one wheel 3 or a plurality of wheels 3. The torque sensor 13b detects torque given to the steering unit 4 by the driver, for example.

As illustrated in FIG. 2, four imaging units 15a to 15d, for example, are provided as a plurality of imaging units 15 in the vehicle body 2. The imaging units 15 are a digital camera that incorporates an imaging element thereinto, such as a charge coupled device (CCD) and a CMOS image sensor (CIS), for example. The imaging units 15 can output moving image data at a certain frame rate. The imaging units 15 each have a wide-angle lens or a fish-eye lens and can photograph the range from 140° to 190°, for example, in the horizontal direction. The optical axis of each of the imaging units 15 is set to be directed obliquely downward. Thus, the imaging units 15 sequentially photograph the external environment surrounding the vehicle body 2 including road surfaces on which the vehicle 1 can travel and areas in which the vehicle 1 can be parked, and output it as imaged image data.

The imaging unit 15a is positioned at an end 2e on the rear side of the vehicle body 2, and is provided to a wall in the lower portion of a door 2h of a rear trunk, for example. The imaging unit 15b is positioned at an end 2f or the right side of the vehicle body 2, and is provided to a door mirror 2g on the right side, for example. The imaging unit 15c is positioned at an end 2c on the front side of the vehicle body 2, that is, on the front side in the fore-and-aft direction of the vehicle, and is provided to a front bumper and the like, for example. The imaging unit 15d is positioned at an end 2d on the left side of the vehicle body 2, that is, on the left side in the vehicle width direction, and is provided to the door mirror 2g as a protruding part on the left side, for example. The ECU 14 can perform arithmetic processing and image processing based on image data obtained by the imaging units 15 to generate an image having a wider angle of visibility or generate a virtual bird's eye view image when the vehicle 1 is viewed from above. The bird's eye view image can also be referred to as a plane image.

The ECU 14 also identifies a division line and the like designated on road surfaces around the vehicle 1 using images obtained by the imaging units 15, and detects (extracts) a parking section designated by the division line.

As illustrated in FIGS. 1 and 2, four distance measuring units 16a to 16d and eight distance measuring units 17a to 17h, for example, are provided as a plurality of distance measuring units 16 and 17 in the vehicle body 2. The distance measuring units 16 and 17 are a sonar that emits ultrasound and captures its reflected wave, for example. The sonar can also be referred to as a sonar sensor or an ultrasonic sonar. The ECU 14 can measure the presence of an object such as an obstacle located around the vehicle 1 and the distance to the object, based on detection results from the distance measuring units 16 and 17. Specifically, the distance measuring units 16 and 17 are examples of a detection unit configured to detect objects. The distance measuring units 17 can be used to detect objects at a relatively short distance, for example, while the distance measuring units 16 can be used to detect objects at a relatively long distance that is farther than the objects the distance measuring units 17 detect, for example. The distance measuring units 17 can be used to detect objects ahead and behind the vehicle 1, while the distance measuring units 16 can be used to detect objects at the lateral sides of the vehicle 1, for example.

As illustrated in FIG. 4, in a parking assistance system 100, a brake system 18, a steering angle sensor 19, an accelerator sensor 20, a shift sensor 21, a wheel speed sensor 22, and the like are electrically connected via an in-vehicle network 23 as an electric communication line, in addition to the ECU 14, the monitor device 11, the steering system 13, and the distance measuring units 16 and 17. The in-vehicle network 23 is configured as a controller area network (CAN), for example. The ECU 14 can control the steering system 13, the brake system 18, and the like by transmitting control signals to them via the in-vehicle network 23. The ECU 14 can also receive detection results from the torque sensor 13b, a brake sensor 18b, the steering angle sensor 19, the distance measuring units 16, the distance measuring units 17, the accelerator sensor 20, the shift sensor 21, the wheel speed sensor 22, and the like as well as operation signals from the operation input unit 10 and the like via the in-vehicle network 23.

The ECU 14 has a central processing unit (CPU) 14a, a read only memory (ROM) 14b, a random access memory (RAM) 14c, a display control unit 14d, a sound control unit 14e, and a solid state drive (SSD, flash memory) 14f, for example. The CPU 14a can perform a variety of arithmetic processing and control, such as image processing concerned with images displayed on the display devices 8 and 12, determination of a travel target position of the vehicle 1, arithmetic processing of a travel route of the vehicle 1, judgment as to whether interference with an object is present, automatic control of the vehicle 1, and release of automatic control. The CPU 14a can read a computer program installed and stored in a nonvolatile memory such as the ROM 14b, and perform arithmetic processing in accordance with the program. The RAM 14c temporarily stores therein various types of data to be used for arithmetic processing performed by the CPU 14a. The display control unit 14d primarily performs image processing that uses the image data obtained by the imaging units 15 and composition of image data displayed on the display device 8, out of the arithmetic processing performed by the ECU 14. The sound control unit 14e primarily processes sound data output by the sound output device 9, out of the arithmetic processing performed by the ECU 14. The SSD 14f is a rewritable nonvolatile memory and can store therein data even when the power of the ECU 14 is turned off. The CPU 14a, the ROM 14b, the RAM 14c, and the like can be integrated in the same package. The ECU 14 may have a configuration in which other logical operation processor such as a digital signal processor (DSP) or a logic circuit is used instead of the CPU 14a. A hard disk drive (HDD) may be provided instead of the SSD 14f, and the SSD 14f and the HDD may be provided separately from the ECU 14.

The brake system. 18 is an anti-lock brake system (ABS) that prevents locking of the brake, electronic stability control (ESC) that prevents a skid of the vehicle 1 during cornering, an electric brake system that increases braking force (performs brake assist), or brake by wire (BBW), for example. The brake system 18 applies braking force to the wheels 3, in turn to the vehicle 1 via an actuator 18a. The brake system 18 can perform a variety of control by detecting locking of the brake, idling of the wheels 3, and a sign of a skid based on the rotational difference between the right and left wheels 3. The brake sensor 18b is a sensor configured to detect the position of a movable part of the braking operation unit 6, for example. The brake sensor 18b can detect the position of a brake pedal serving as the movable part of the braking operation unit 6. The brake sensor 18b includes a displacement sensor.

The steering angle sensor 19 is a sensor configured to detect the steering amount of the steering unit 4 such as a steering wheel, for example. The steering angle sensor 19 is configured by using a Hall element, for example. The ECU 14 acquires the steering amount of the steering unit 4 by the driver, the steering amount of each wheel 3 during automatic steering, and the like from the steering angle sensor 19 to perform a variety of control. The steering angle sensor 19 detects the turning angle of a turnlng part included in the steering unit 4. The steering angle sensor 19 is an example of an angle sensor.

The accelerator sensor 20 is a sensor configured to detect the position of a movable part of the accelerating operation unit 5, for example. The accelerator sensor 20 can detect the position of an accelerator pedal serving as the movable part. The accelerator sensor 20 includes a displacement sensor.

The shift sensor 21 is a sensor configured to detect the position of a movable part of the gear shift operation unit 7, for example. The shift sensor 21 can detect the position of a lever, an arm, a button, and the like serving as the movable part of the gear shift operation unit 7. The shift sensor 21 may include a displacement sensor or may be configured as a switch.

The wheel speed sensor 22 is a sensor configured to detect the rotation amount and the rotation speed per unit time of the wheel(s) 3. The wheel speed sensor 22 outputs a wheel speed pulse number indicating the detected rotation speed as a sensor value. The wheel speed sensor 22 is configured by using a Hall element, for example. The ECU 14 calculates the travel amount and the like of the vehicle 1 based on the sensor value acquired from the wheel speed sensor 22 to perform a variety of control. The wheel speed sensor 22 is provided in the brake system 18 in some cases. In such cases, the ECU 14 acquires the detection result of the wheel speed sensor 22 via the brake system 18.

The configurations, arrangements, and electrical connections of various sensors and actuators described above are merely examples, and can be set (changed) in various ways.

In the present embodiment, the ECU 14 achieves at least part of functions as a parking assistance device by causing hardware and software (a control program) to cooperate with each other.

Figure 5:
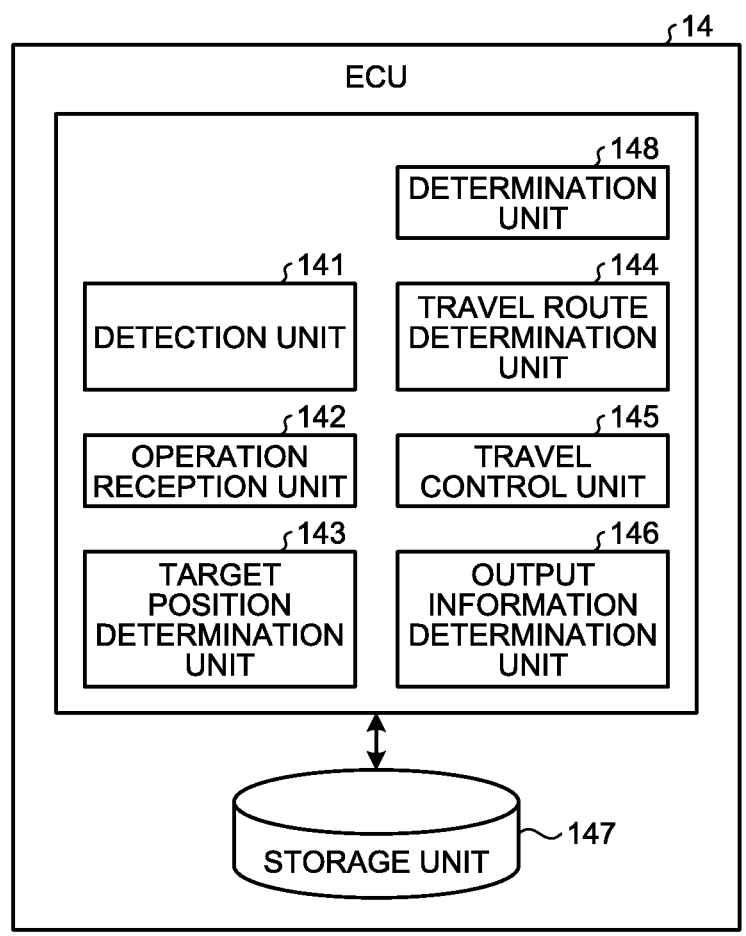
FIG. 5 is an exemplary block diagram illustrating a configuration of an ECU of the parking assistance system according to embodiment.

FIG. 5 is a functional configuration block diagram of the ECU.

As illustrated in FIG. 5, the ECU 14 functions as a detection unit 141, an operation reception unit 142, a target position determination unit 143, a travel route determination unit 144, a travel control unit 145, an output information determination unit. 146, a determination unit 148, and a storage unit 147.

In the configuration, the detection unit 141 detects another vehicle, obstacles such as pillars, frame lines such as parking division lines, and the like.

The operation reception unit 142 acquires an operation signal by the operation input of an operation unit 14g. The operation unit 14g includes a push button and a switch, for example, and outputs the operation signal.

The target position determination unit. 143 determines a travel target position (a parking target position) of the vehicle 1.

The travel route determination unit 144 determines a travel route to the travel target position of the vehicle 1.

The travel control unit 145 (a control unit) controls the units of the vehicle 1 so as to cause the vehicle 1 to travel to the travel target position (the parking target position) along the travel route.

The output information determination unit 146 determines information to be output by the display devices 12 and 8, the sound output device 9, and the like, the output mode of the information, and the like.

The determination unit 148 determines whether a parking space length L of a frontage that the vehicle 1 enters in a parkable area is the sum of the full length of the vehicle 1 and a certain length a or more.

The storage unit 147 stores therein data to be used for the arithmetic processing by the ECU 14 or calculated by the arithmetic processing by the ECU 14.

Figure 6:
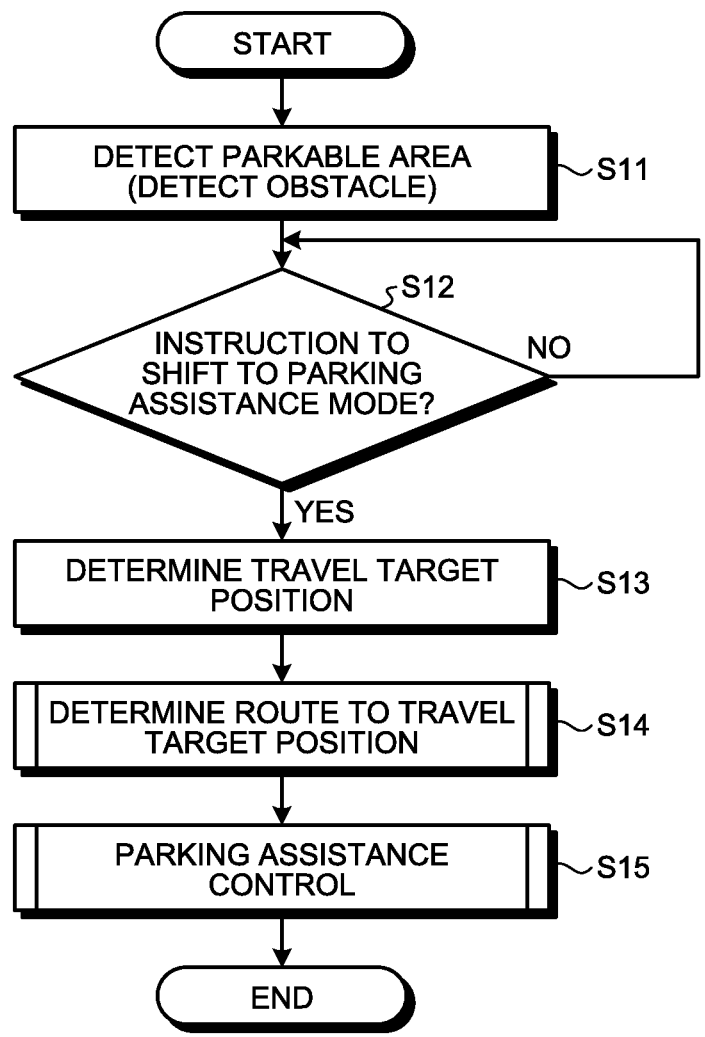
FIG. 6 is a flowchart illustrating a procedure of general processing according to the embodiment.
Figure 7:
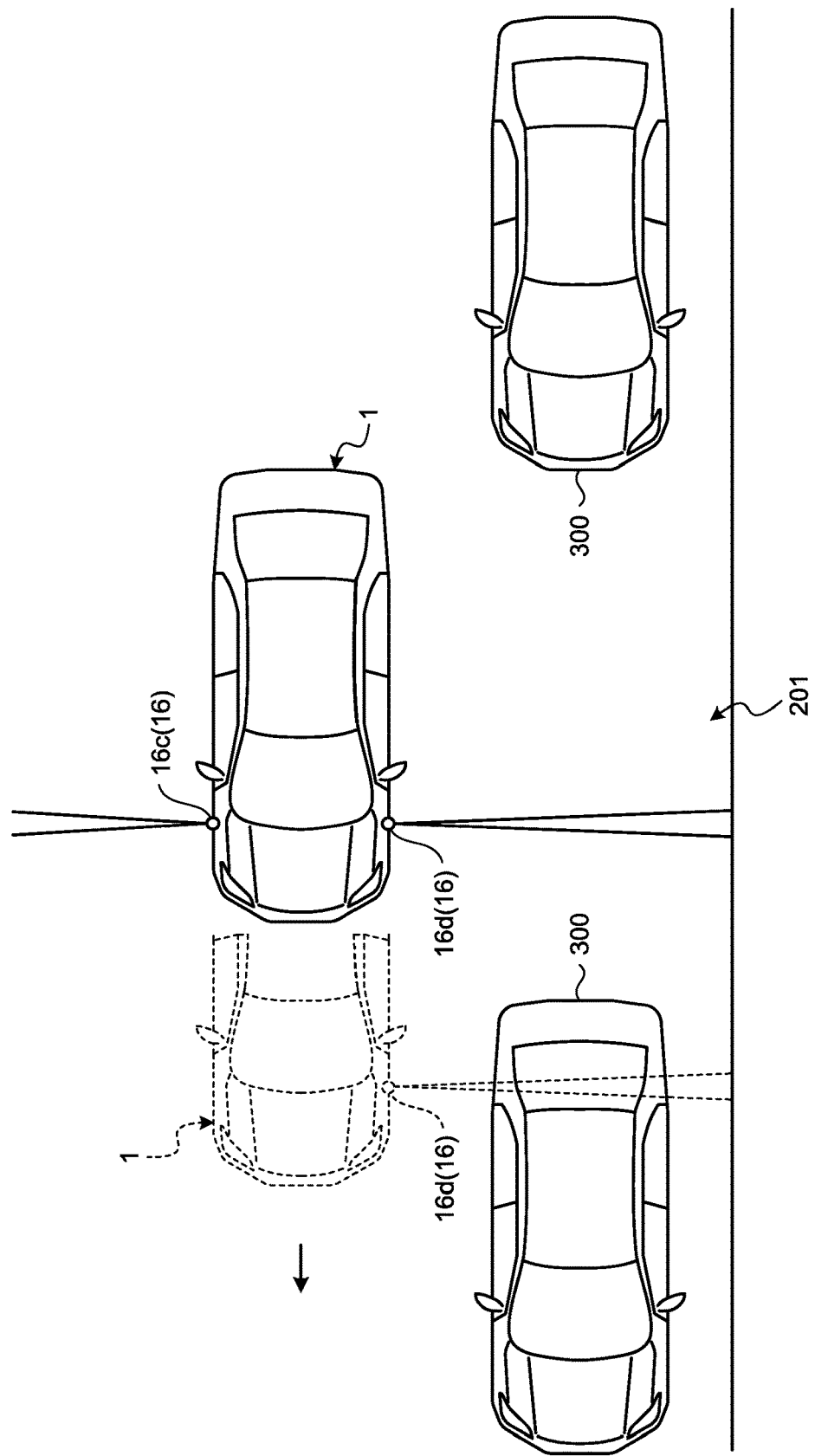
FIG. 7 is an illustrative diagram of parkable area detection according to the embodiment.

The following describes the operation of the embodiment. FIG. 6 is a general processing flowchart according to the embodiment. First, the ECU 14 performs parkable area detection (obstacle detection) (Step S11). FIG. 7 is an illustrative diagram of the parkable area detection. Specifically, the distance measuring units 16c and 16d calculate the distance to an obstacle such as another vehicle 300 for each certain sampling timing and outputs the distance as data corresponding to the reflection point (the aggregate of reflection points of sound waves or the like) of the obstacle. The output data is stored in the RAM 14c for each output period, for example.

The ECU 14 functions as the detection unit 141 to detect a parkable area 201 positioned on the side of the vehicle 1 based on the output data of the distance measuring unit 16d. More specifically, the detection unit 141 determines that the parkable area 201 is present when output data corresponding to a case in which output data corresponding to an obstacle is output for a period corresponding to a first certain length or more and then the obstacle is absent (including a case in which the distance to the obstacle is a length or more in the width direction of the vehicle required for the parking of the vehicle) for a period of a second specified length corresponding to a minimum width required as an area in which the vehicle 1 can be parked or more is output.

The detection unit 141 can also detect the parkable area 201 by performing edge detection using the imaging data of parking division lines and the like such as white lines provided on a travel surface such as the ground or a road surface based on the imaging data output by the imaging unit 15d that images the left side of the vehicle 1.

Subsequently, the ECU 14 functions as the operation reception unit 142 to determine whether an instruction to shift to a parking assistance mode has been performed via the operation unit 14g (Step S12).

If the instruction to shift to the parking assistance mode has not yet been performed via the operation unit 14g in the determination at Step S12 (No at Step S12), a standby state is made.

If the instruction to shift to the parking assistance mode has been performed via the operation unit 14g in the determination at Step S12 (Yes at Step S12), the ECU 14 functions as the target position determination unit 143 to determine the travel target position (the parking target position) of the vehicle 1 (Step S13).

Subsequently, the ECU 14 functions as the travel route determination unit 144 to determine the travel route to the travel target position of the vehicle 1 (Step S14).

Figure 8:
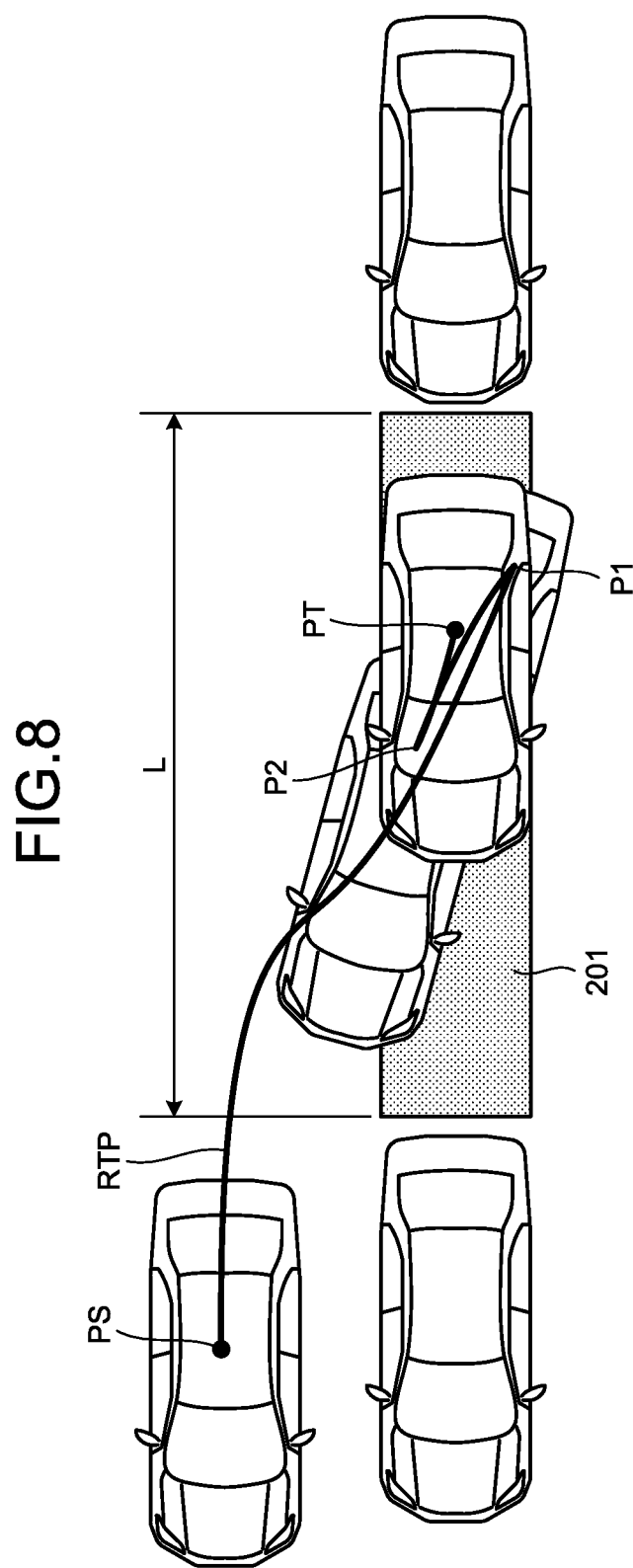
FIG. 8 is an illustrative diagram of a setting example of a travel route according to the embodiment.

FIG. 8 is an illustrative diagram of a setting example of the travel route. FIG. 8 illustrates a case of the travel route having two turning positions P1 and P2 of the steering wheel as the steering unit 4.

In a travel route RTP in FIG. 8, the steering wheel as the steering unit 4 is steered to the left by a certain amount from an initial position PS at the start of parking assistance control processing on the vehicle 1, the vehicle reverses, and is directed toward the turning position P1 of the steering wheel as the steering unit 4. In the travel route RTP, the driver pushes down the brake pedal as the braking operation unit 6 at the turning position P1 to stop the vehicle, changes gears to advancing, and is directed toward the turning position P2 of the steering wheel as the steering unit 4 while steering the steering wheel as the steering unit 4 slightly to the right. In the travel route RTP, the driver pushes down the brake pedal as the braking operation unit 6 at the turning position P2 to stop the vehicle 1, changes gears to reversing, and is directed toward a parking target position PT.

In FIG. 8, L is a parking space length of a frontage through which the vehicle 1 enters the parkable area 201. When the detection unit 141 detects the parkable area. 201, the parking space length L is calculated.

Figure 9:
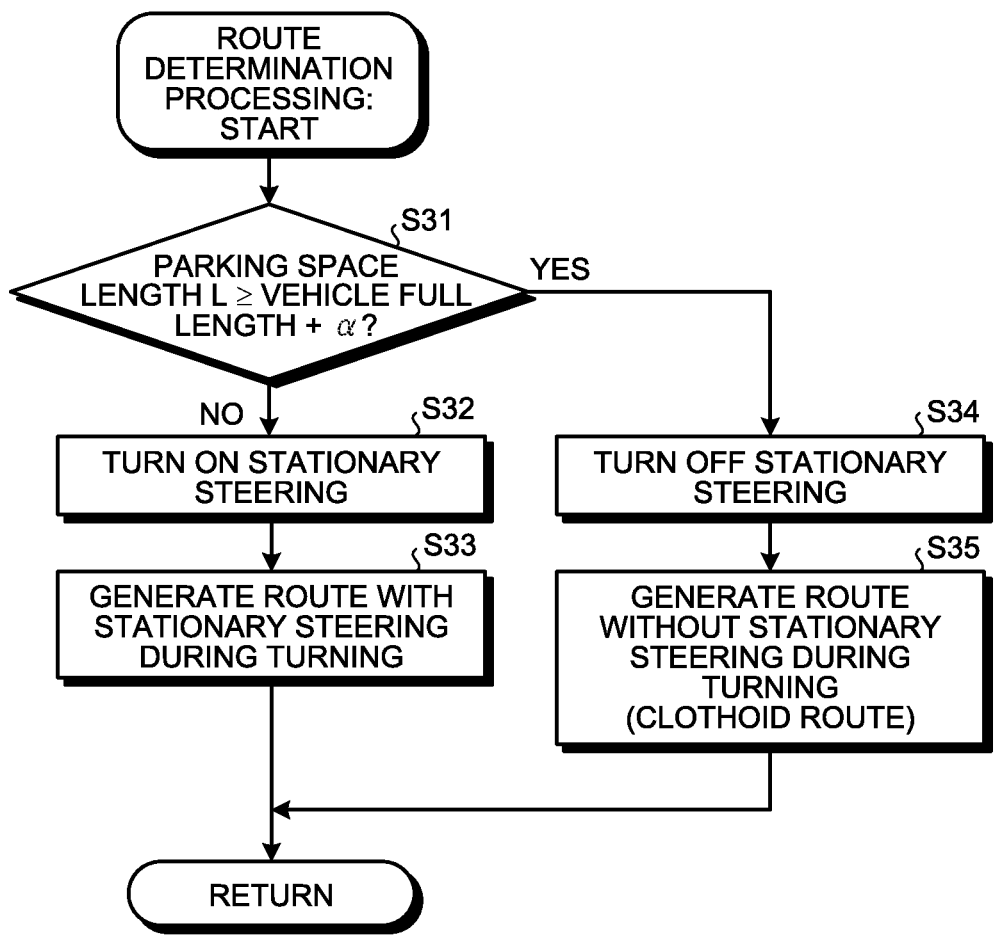
FIG. 9 is a flowchart illustrating a procedure of route determination processing according to the embodiment.

In the present embodiment, the travel route RTP is further determined as follows. FIG. 9 is a flowchart illustrating a procedure of route determination processing of the present embodiment.

The ECU 14 functions as the determination unit 148 to determine whether the parking space length L of the parkable area 201 is the sum of the full length of the vehicle 1 (the length in the fore-and-aft direction of the vehicle 1) and the certain length α or more (Step S31).

If the parking space length L is less than the sum of the full length of the vehicle 1 and the certain length α (No at Step S31), the ECU 14 functions as the travel route determination unit 144 to determine that the space of the parkable area 201 is small and to set a stationary steering flag to on (Step S32). The stationary steering flag is a flag indicating whether stationary steering is performed during turning and is stored in the RAM 14c or the like. The stationary steering flag is referred to in parking assistance control by the travel control unit 145. If the stationary steering flag is on, stationary steering is performed during turning, whereas if the stationary steering flag is off, stationary steering is not performed during turning.

The travel route determination unit 144 generates and determines the travel route RTP with stationary steering during turning (Step S33).

In contrast, if the parking space length L is the sum of the full length of the vehicle 1 and the certain length α or more at Step S31 (Yes at Step S31), the travel route determination unit 144 determines that the space of the parkable area 201 is sufficiently large to set the stationary steering flag to off (Step S34). The travel route determination unit 144 generates and determines the travel route RTP without stationary steering during turning so as to be a route of a clothoid curve (a clothoid route) (Step S35).

In this case, the travel route determination unit 144 determines the curvature gradient of the travel route RTP in accordance with the parking space length L. More specifically, the travel route determination unit 144 determines the curvature gradient of the travel route RTP to be gentler as the parking space length L increases.

The travel route determination unit 144 may be configured to determine the travel route RTP so as to cause the vehicle to drive over a lowermost curb in FIG. 8 of the parkable area 201 when the parking space length L is short (is shorter than a certain reference length).

Referring back to FIG. 6, upon determination of the travel route RTP, the ECU 14 shifts to parking assistance control (Step S15).

Figure 10:
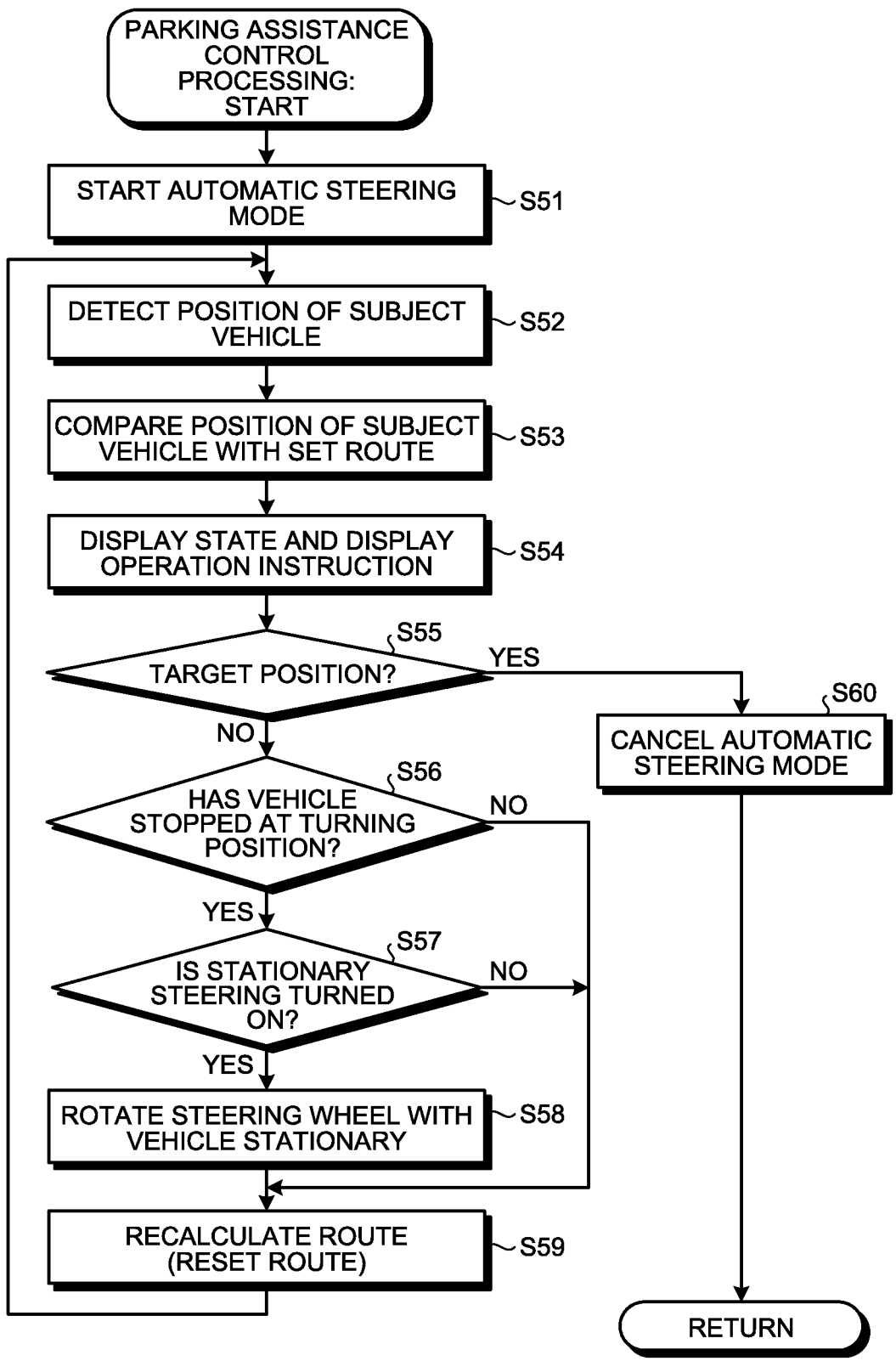
FIG. 10 is a flowchart illustrating a procedure of parking assistance control processing according to the embodiment.

FIG. 10 is a processing flowchart of the parking assistance control processing. First, the ECU 14 functions as the travel control unit 145 to start an automatic steering mode that performs automatic steering in order to control the units of the vehicle 1 so as to cause the vehicle 1 to travel to the parking target position as the travel target position along the travel route (Step S51).

in this automatic steering mode, the driver is not required to perform the operation of the steering unit 4, or specifically, the operation of the steering wheel. The advance driving force and the reverse driving force of the vehicle 1 during the parking assistance control processing use creeping in which the driving force of an engine is transmitted without performing the push-down operation of the accelerator pedal as the operation of the accelerating operation unit 5.

Consequently, all that is required for the driver is to perform the operation of the brake pedal as the braking operation unit 6 and the shift lever as the gear shift operation unit 7 in accordance with the display of the display device 12.

Subsequently, the travel control unit 145 detects the position of the subject vehicle (Step S52). Specifically, the detection of the position of the subject vehicle by the travel control unit 145 (the ECU 14) is detection by the calculation of a distance and a direction as travel amounts from the initial position PS based on the steering amount of the steering unit 4 detected by the steering angle sensor 19 and a vehicle speed detected by the wheel speed sensor 22.

The ECU 14 then compares a set route and the position of the subject vehicle (Step S53), determines vehicle state information and an operation instruction to the driver as the output information determination unit 146, and displays the vehicle state information and the operation instruction to the driver on the display device 12 (St S54).

Figure 11:
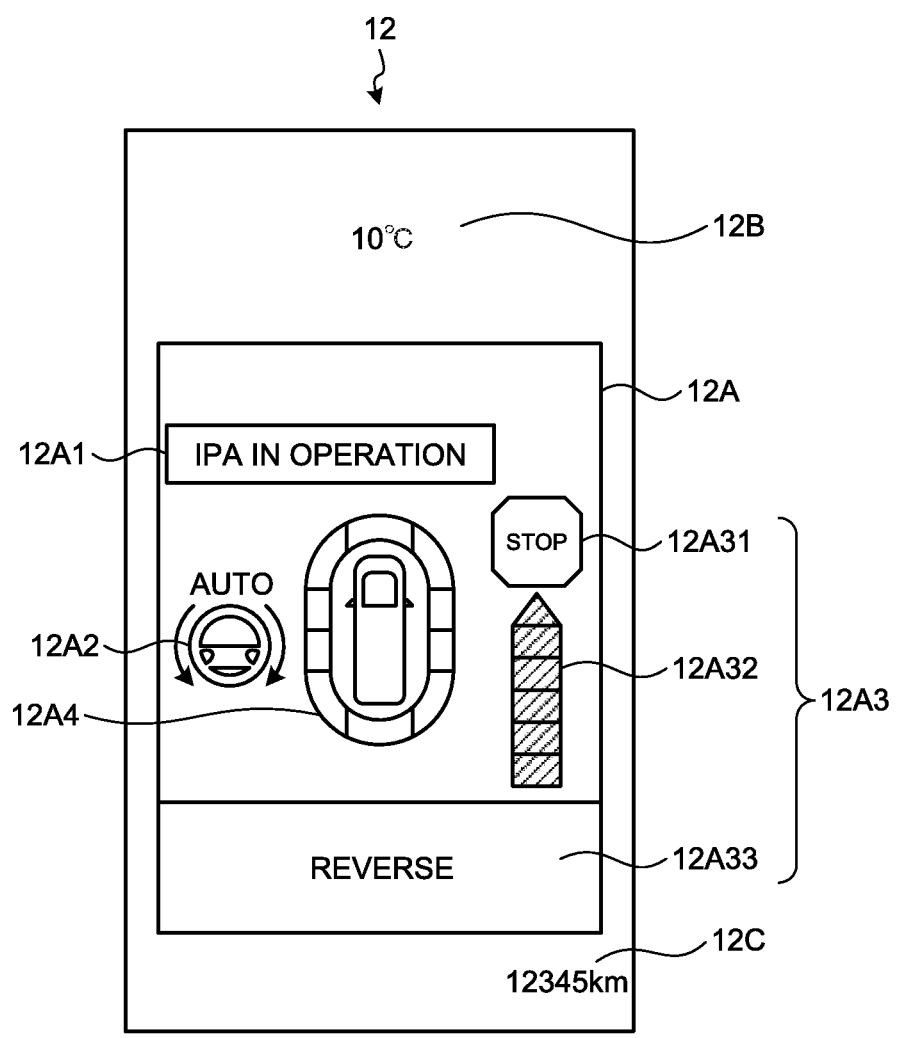
FIG. 11 is an illustrative diagram of a display example at the start of the parking assistance control processing according to the embodiment.

FIG. 11 is an illustrative diagram of a display example at the start of the parking assistance control processing. The display screen of the display device 12 broadly includes a first display area 12A displaying various kinds of information on parking assistance, a second display area 12B displaying various kinds of information selected in advance, and a third display area 12C that can display information on a odometer or a tripmeter.

The first display area 12A includes a parking assistance display unit 12A1 that, when Intelligent Parking Assistance (IPA) is in operation, displays the fact, a symbol unit 12A2 that, during the automatic steering mode, displays a symbol indicating being in the automatic steering mode, an operation display unit 12A3 displaying the operation instruction to the driver, and an obstacle display unit 12A4 that, when an obstacle is present within a certain distance range around the vehicle 1, indicates a direction in which the obstacle is positioned by the distance measuring units 16 and 17.

In the configuration, as illustrated in FIG. 11, the operation display unit 12A3 displays a braking operation symbol 12A31 that is lighted when an operation instruction of the brake pedal as the braking operation unit 6 is performed, displays an estimated distance symbol 12A32 displaying an estimated distance to the turning position of the steering wheel as the steering unit 4 or an estimated distance to the travel target position so as to be shifted from a fully lighted state to an extinguished state stepwise, and displays an instruction display unit 12A33 displaying instruction details to the driver.

In other words, in the case in FIG. 11, the parking assistance is in operation, the automatic steering mode is on, the distance to the turning position of the steering wheel as the steering unit 4 or the parking target position PT as the travel target position still remains in an amount of nearly 100%, and instruction details that cause the driver to stop the push-down operation of the brake pedal as the braking operation unit 6 and to reverse by creeping are displayed.

As another example, when the travel control unit 145 detects the position of the subject vehicle (Step S52) and compares the position of the subject vehicle with the set route (Step S53), if it is determined that the position of the subject vehicle has reached the turning positions P1 and P2 of the steering wheel as the steering unit 4, the output information determination unit 146 determines the vehicle state information and the operation instruction to the driver at the turning positions and displays the vehicle state information and the operation instruction to the driver on the display device 12 (Step S54).

Figure 12:
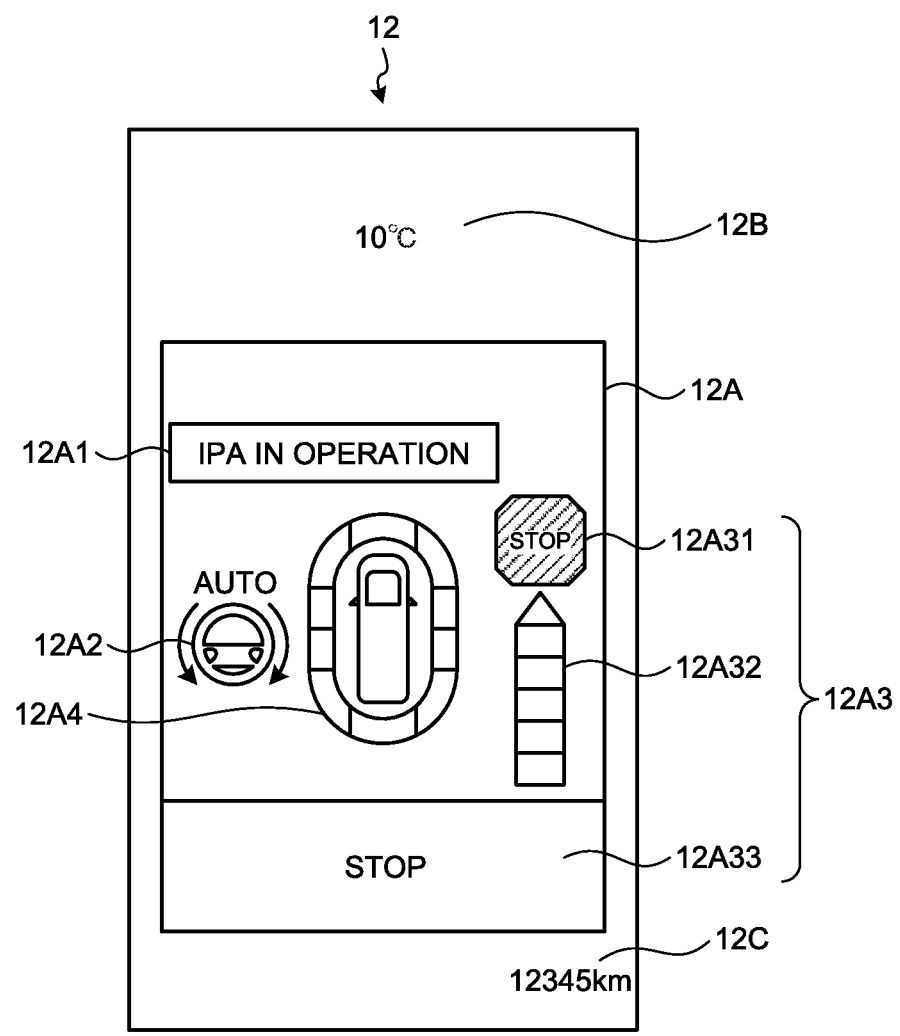
FIG. 12 is an illustrative diagram of a display example when the position of a subject vehicle has reached a turning position in the embodiment.

FIG. 12 is an illustrative diagram of a display example when the position of the subject vehicle has reached the turning position. When the subject vehicle has reached the turning position, the ECU 14 brings the braking operation symbol 12A31 into a lighted state, performs display saying "Stop", for example, on the instruction display unit 12A33, and performs the operation instruction of the brake as the braking operation unit 6 to the driver.

Subsequently, the ECU 14 functions as the travel control unit 145 to determine whether the position of the subject vehicle has reached the parking target position PT as the target position (Step S55).

If the position of the subject vehicle has not yet reached the parking target position PT as the target. position (No at Step S55), it is determined whether the vehicle 1 has stopped at the turning position (Step S56).

If the vehicle 1 has not yet stopped at the turning position (No at Step S56), the ECU 14 again functions as the travel route determination unit 144 to recalculate the travel route and to reset the travel route (Step S59). Specifically, the route determination processing described in FIG. 9 is performed. This is to keep a better travel route in accordance with actual conditions, because the vehicle 1 cannot necessarily travel along the set travel route depending on road conditions and the like.

The ECU 14 then shifts the processing to Step S52 again to repeat similar processing.

If it is determined that the vehicle 1 has stopped at the turning position at Step S56 (Yes at Step S56), the travel control unit 145 determines whether the stationary steering flag stored in the RAM 14c is on (Step S57). If the stationary steering flag is on (Yes at Step S57), the travel control unit 145 rotatingly drives the steering wheel with the vehicle 1 stationary to perform stationary steering (Step S58). In contrast, if the stationary steering flag is off at Step S57 (No at Step S57), the travel control unit 145 does not perform the stationary steering at Step S58.

Figure 13:
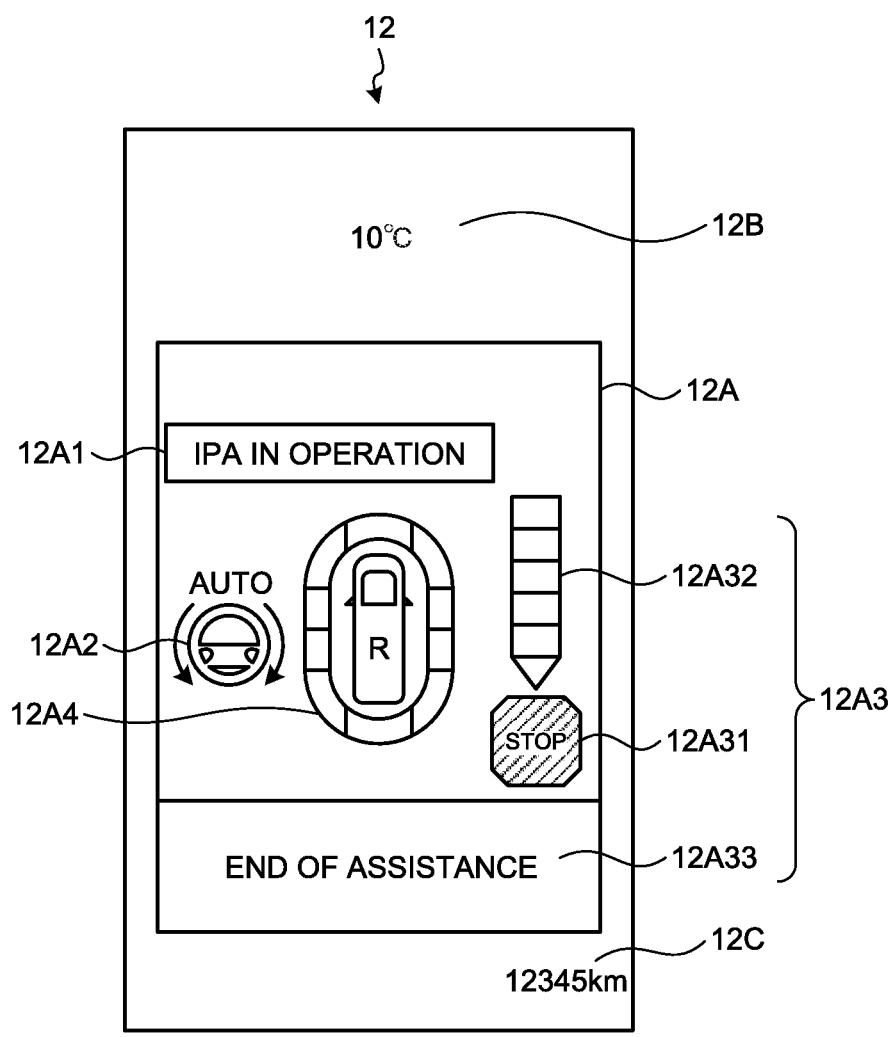
FIG. 13 is an illustrative diagram of a display example at the end of parking assistance in the embodiment.

Subsequently, the travel control unit 145 resets the route at Step S59, and the process returns to Step S52.

if it is determined that the position of the subject vehicle has reached the parking target position PT as the target position at Step S55 (Yes at Step S55), the travel control unit 145 cancels the automatic steering mode (Step S60), and the ECU 14 displays the end of the parking assistance processing on the instruction display unit 12A33 to end the parking assistance processing. FIG. 13 is an illustrative diagram, of a display example at the end of the parking assistance.

Thus, in the present embodiment, when the parallel parking of the vehicle in the parkable area 201 is assisted, when the parking space length L of the frontage that the vehicle 1 enters in the parkable area is the sum of the full length of the vehicle 1 and the certain length α or more, the parking assistance for the vehicle 1 is performed along the route in which stationary steering control is not performed at the turning position of the vehicle 1. Consequently, stationary steering is not performed during turning when the parking space is large, and the present embodiment can reduce an overload on the vehicle caused by an increase in the number of times of turning. Consequently, the present embodiment can reduce a psychological burden on the driver and can reduce an overload on the steering system, whereby the parking assistance control can be performed to the end.

Although the embodiment of the present invention has been described, the embodiment is presented by way of example and is not intended to limit the scope of the invention. The novel embodiment can be achieved in various other forms, and various omissions, substitutions, and modifications can be made without departing from the gist of the invention. The embodiment and modifications thereof are included in the scope and the gist of the invention and are also included in the invention described in the claims and the equivalents thereof.

Although the presence or absence of stationary steering during turning is determined when the travel route RTP is determined in the present embodiment, for example, the presence or absence of stationary steering during turning may be determined when the vehicle 1 has actually reached the turning positions P1 and P2.

In this case, the travel control unit 145 can determine the presence or absence of stationary steering in accordance with the condition of the vehicle 1.

Providing a temperature sensor near an electric power steering system (EPS) within the steering system 13 to detect the temperature of the EPS by the temperature sensor as the condition of the vehicle 1, the travel control unit 145 may be configured to determine whether the detected temperature is a certain reference temperature or more, not to perform stationary steering if the detected temperature is the reference temperature or more, and to perform stationary steering if the detected temperature is less than the reference temperature in addition to the determination based on the parking space length L, for example. In this case, the overload on the EPS can be prevented more appropriately.

The travel control unit 145 may be configured to determine whether stationary steering is performed based on the inclination (the deflection angle) or the travelable distance of the vehicle 1 as the condition of the vehicle 1 when the vehicle 1 has reached the turning positions P1 and P2. The travel control unit 145 can be configured to perform stationary steering if the deflection angle of the vehicle 1 is a certain angle or more and not to perform stationary steering if the deflection angle is less than the certain angle, for example. The travel control unit 145 can be configured to perform stationary steering if the travelable distance of the vehicle 1 is less than a certain distance and not to perform stationary steering if the travelable distance is the certain distance or more. Consequently, an overload on the vehicle 1 can be reduced.

The travel control unit 145 may be configured to determine whether stationary steering is performed by the driver when the vehicle 1 has reached the turning positions P1 and P2. The travel control unit 145 can be configured to determine that stationary steering has been performed if the driver has operated the steering wheel when the vehicle 1 has reached the turning positions P1 and P2 and stopped, whereas the travel control unit 145 can be configured to determine that stationary steering is not performed if a certain time has elapsed while the vehicle 1 remains stationary and while the operation of the steering wheel by the driver is absent, for example. Consequently, the psychological burden on the driver can be reduced more appropriately.

Even when the automatic steering mode is normally canceled if the driver has operated the steering wheel in the parking assistance control, the travel control unit 145 may be configured not to cancel the automatic steering mode if the driver has operated the steering wheel at the turning position.

The invention claimed is:

1. A parking assistance device comprising:
an electronic control unit comprising at least one processor, the electronic control unit configured as:
 a determination unit that determines, when parallel parking of a vehicle in a parking area is assisted, whether a parking space length of an open side of the parking area that the vehicle enters is a sum of a full length of the vehicle and a certain length or more; and a control unit that performs parking assistance for the vehicle:

on a first route on which stationary steering control is not performed at a turning position when the parking space length is the sum of the full length of the vehicle and the certain length or more, and on a second route on which stationary steering control is performed at the turning position when the parking space length is less than the sum of the full length of the vehicle and the certain length, wherein the turning position is a position at which a traveling direction of the vehicle is changed between forward and rearward on the first route or the second route to the parking area.

2. The parking assistance device according to claim 1, wherein the control unit further determines whether stationary steering control is performed based on a deflection angle or a travelable distance of the vehicle at the turning position.

3. The parking assistance device according to claim 1, further comprising a temperature sensor that detects a temperature of an electric power steering system, wherein the control unit further determines whether stationary steering control is performed based on the detected temperature of the electric power steering system.

4. A parking assistance method comprising:

determining, when parallel parking of a vehicle in a parking area is assisted, whether a parking space length of an open side of the parking area that the vehicle enters is a sum of a full length of the vehicle and a certain length or more; and performing parking assistance for the vehicle:

on a first route on which stationary steering control is not performed at a turning position when the parking space length is the sum of the full length of the vehicle and the certain length or more, and on a second route on which stationary steering control is performed at the turning position when the parking space length is less than the sum of the full length of the vehicle and the certain length, wherein the turning position is a position at which a traveling direction of the vehicle is changed between forward and rearward on the first route or the second route to the parking area.

5. A parking assistance device comprising:

an electronic control unit comprising at least one processor, the electronic control unit configured as:

a determination unit that determines, when parking of a vehicle in a parking area is assisted, whether a length of an open side of the parking area that the vehicle enters is a sum of a full length of the vehicle and a certain length or more; and a control unit that performs parking assistance for the vehicle:

on a first route drawn based on a clothoid curve at a turning position when the control unit determines that the length of the open side of the parking area is the sum of the full length of the vehicle and the certain length or more, stationary steering control not being performed on the first route, and on a second route on which stationary steering control is performed at the turning position when the parking space length is less than the sum of the full length of the vehicle and the certain length, wherein the turning position is a position at which a traveling direction of the vehicle is changed between forward and rearward on the first route or the second route to the parking area.

6. The parking assistance device according to claim 1, wherein the control unit recalculates the first route or the second route when the determining unit determines that the vehicle has not stopped at the turning position.

* * * * *